Figure 1:
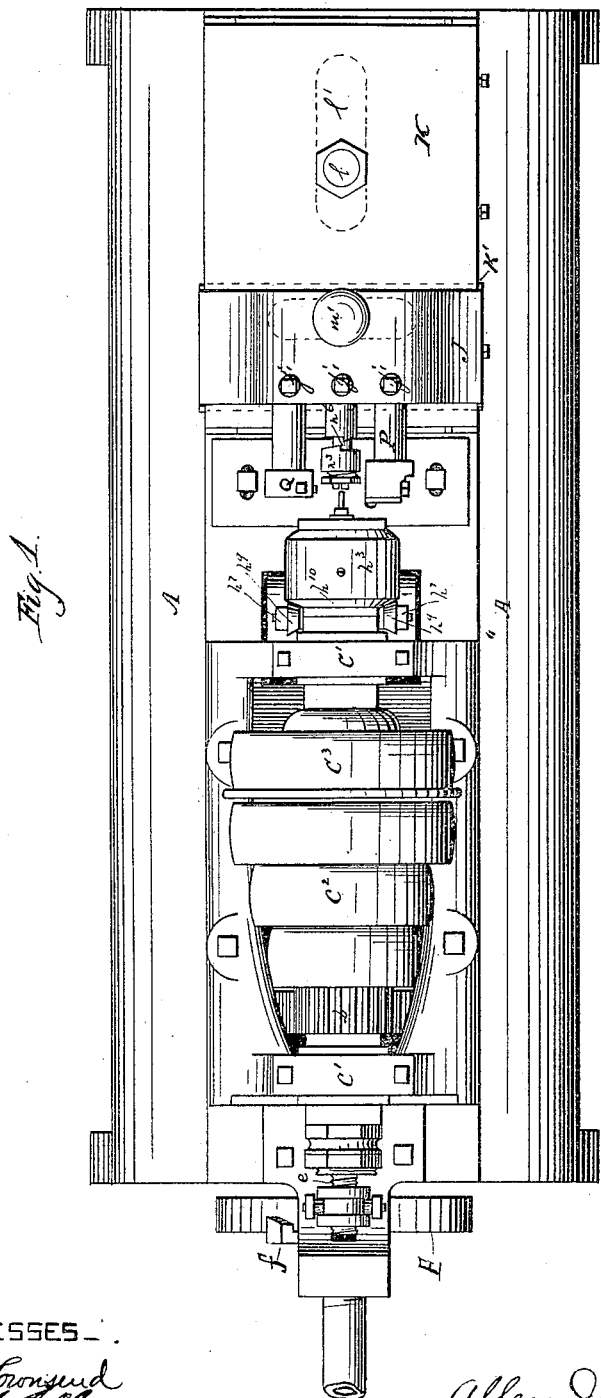

(Model.)

4 Sheets—Sheet 1.

A. JOHNSTON.
Metal Screw Machine.

No. 269,791.  Patented Dec. 26, 1882.

Witnesses—
F. B. Townsend
Chas. W. Allen

Inventor—
Allen Johnston
by Munday, Evarts & Adcock
Attys

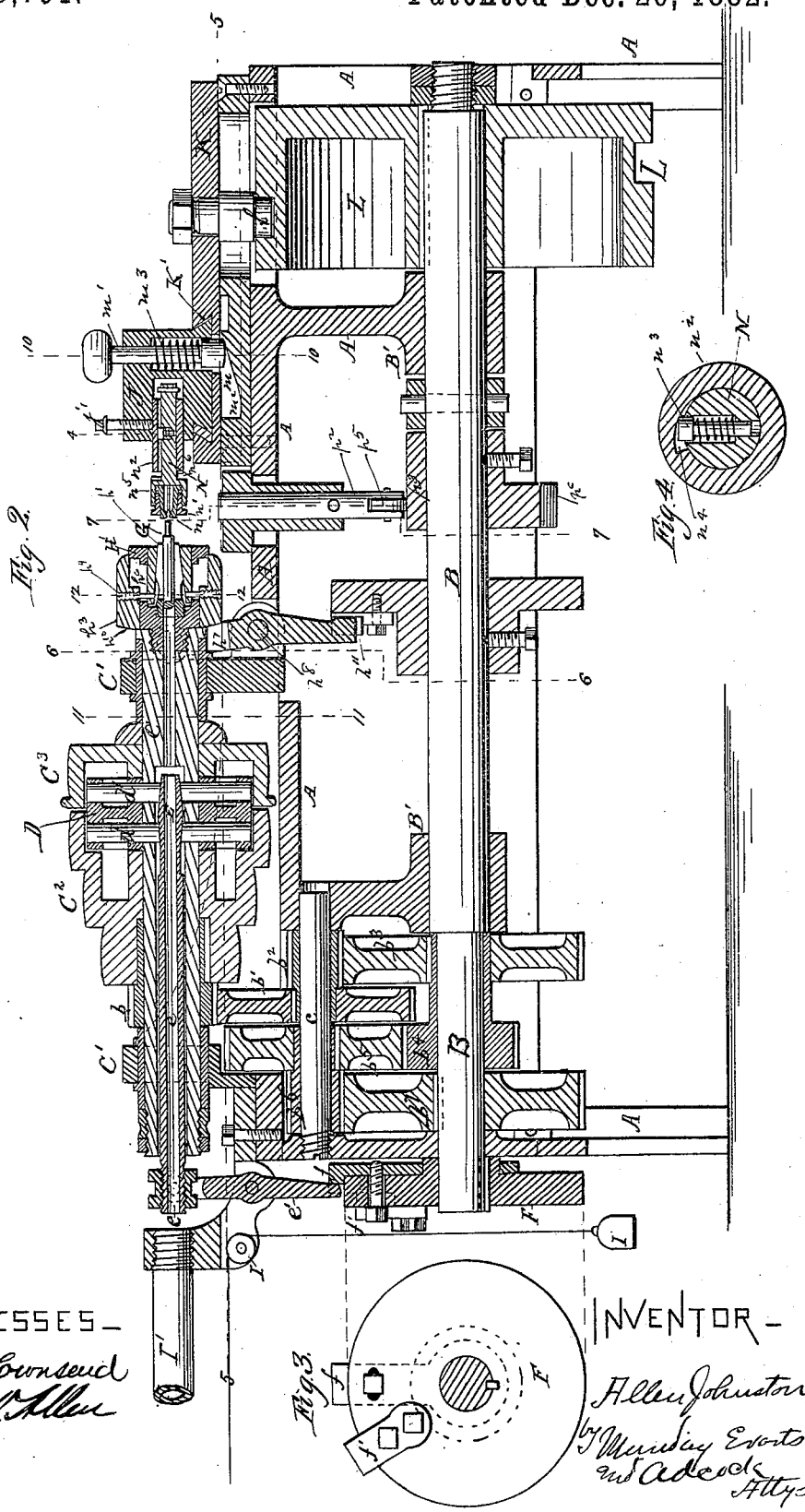

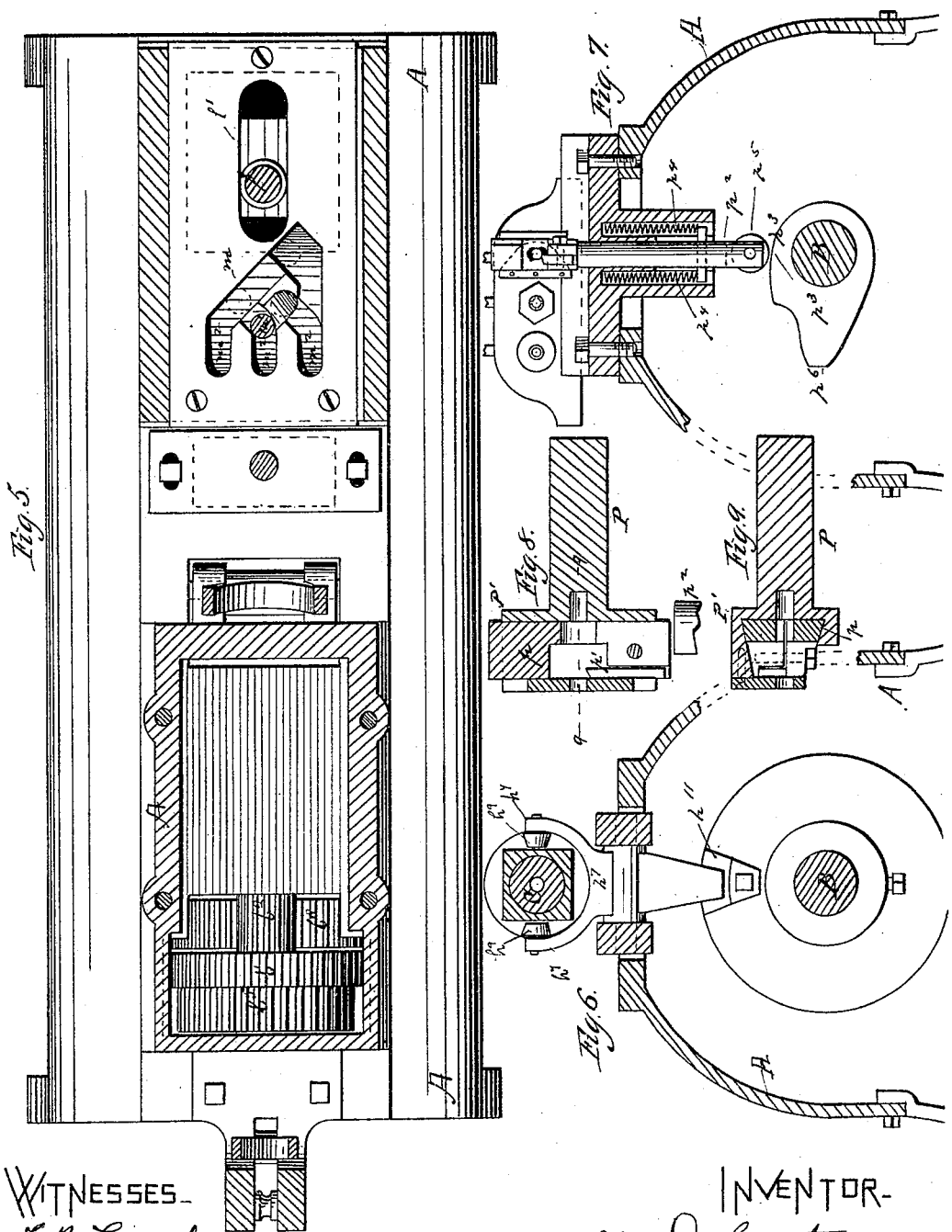

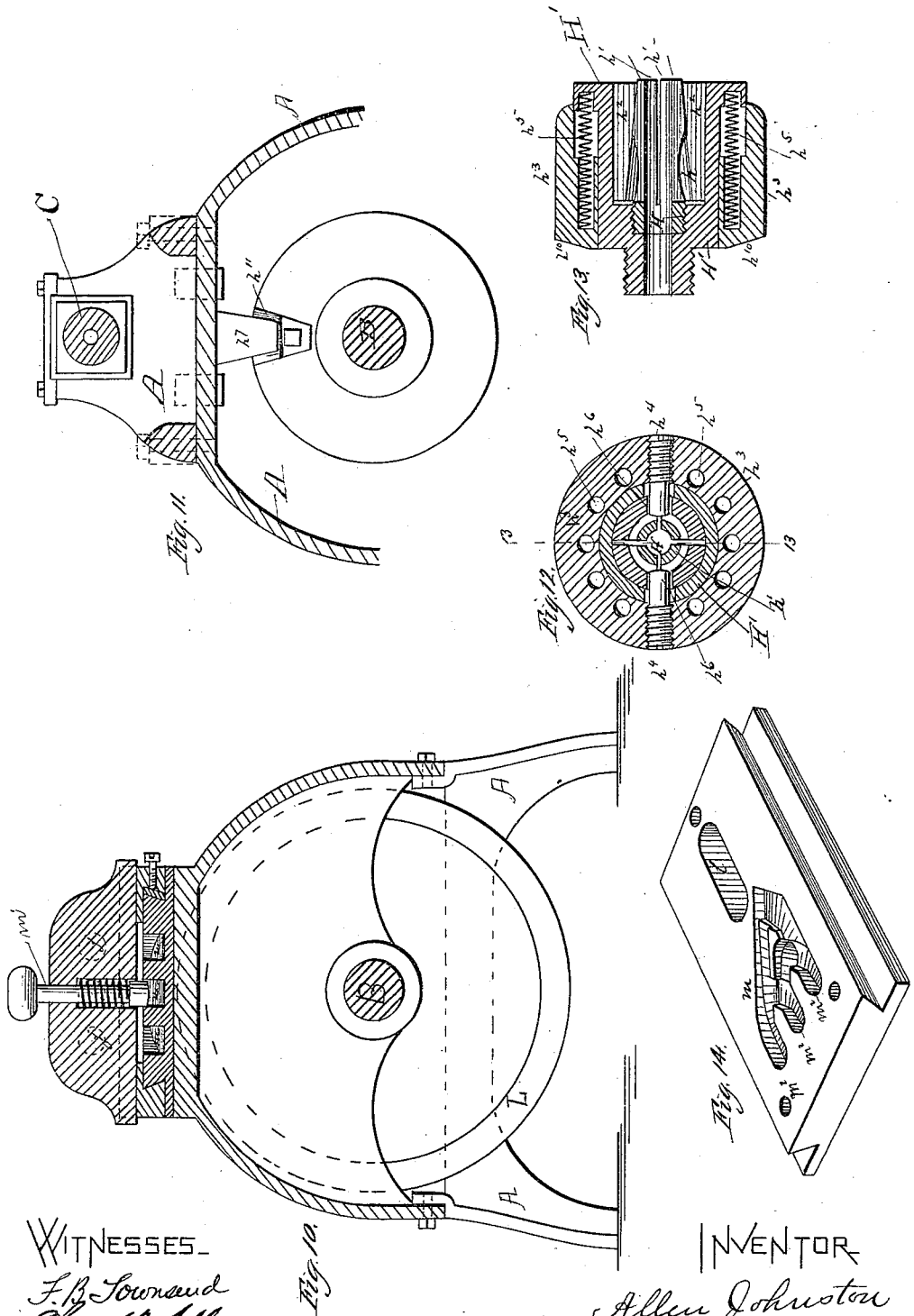

UNITED STATES PATENT OFFICE.

ALLEN JOHNSTON, OF OTTUMWA, IOWA.

METAL-SCREW MACHINE.

SPECIFICATION forming part of Letters Patent No. 269,791, dated December 26, 1882.

Application filed October 22, 1880. (Model.)

*To all whom it may concern:*

Be it known that I, ALLEN JOHNSTON, of Ottumwa, in the county of Wapello, in the State of Iowa, have invented certain new and useful Improvements in Metal-Screw Machines, of which the following is a specification.

My invention relates to automatic machines for making screws, rivets, and other like turned articles from the end of a rod or wire.
Heretofore such machines have usually been constructed with a revolving turret, in which the several screw-forming tools have been mounted, so that by turning the turret the several tools could be presented in turn to the end of the rod. In some machines, however, the chuck and the tools have been combined with slides or reciprocating supports, so that the tools do not have their direction constantly changed, as in the turret-machines, but are always maintained parallel with the axis of the chuck, and are successively brought in line with it by back and forth movements across the said axis. The invention has reference more particularly to this class of machines, although in part not limited thereto.

It consists, first, in the combination, with the chuck, the series of turning-tools—such as the milling, threading, and cutting-off tools— and the longitudinally and laterally movable slides or reciprocatory supports, of a continuously-revolving cam and mechanism operated by said cam for imparting to said slides or supports the requisite lateral and longitudinal movements. Others have operated similar slides or supports by hand or from a cam to which an intermittent rotation is imparted. These dispositions are not within this first part of the invention. By so constructing and combining the parts that the cam may revolve continuously the complicated mechanism used to give an intermittent rotation to the cam is dispensed with and the advantages of an automatic machine are attained, while at the same time the machine is rendered much more simple, efficient, and durable.

The invention secondly consists in the combination, with the chuck, the turning-down or milling tool, the threading-tool, the longitudinal and cross slides, and the means for shifting the cross-slide back and forth, of automatic mechanism—such as a cam and connections—for positively advancing the longitudinal slide, as well in the threading as in the turning-down or milling operation, and for controlling the return of the same when each operation is completed. This combination should be distinguished from one in which the threading-tool, without the longitudinal slide, is drawn forward by the action of the newly-formed thread upon the die, the latter combination being not included by this portion of the invention.

The invention thirdly consists in the combination, with the longitudinal slide, the chuck, and the tools, of a cross-slide and slide-shifting means, operating through the reciprocation of said longitudinal slide, for shifting said cross-slide back and forth, so as to present the tools successively in line with the axis of the chuck. The said shifting means are herein shown as a peculiar-shaped cam and its connections, and will be hereinafter particularly described.

The fourth part of the invention consists in the combination of a hollow chuck-spindle, the chuck carried thereby, means for opening and closing the jaws of said chuck, a longitudinal slide, a cross-slide, a turning-down or milling tool, a threading-tool, and a length-gage.

The invention further comprises the particular new constructions and combinations of parts hereinafter specified.

In the accompanying drawings, which form a part of this specification, Figure 1 is a plan of my improved machine. Fig. 2 is a central vertical longitudinal section of the same. Fig. 3 is an elevation of a cam-wheel, hereinafter to be described. Figs. 4, 6, 7, 10, 11, and 12 are vertical transverse sections taken on the lines 4, 6, 7, 10, 11, and 12 of Fig. 2, respectively. Fig. 12 is enlarged. Fig. 5 is a horizontal section on line 5 of Fig. 2. Fig. 8 is a central vertical longitudinal section of the cutting-off tool in detail and enlarged; and Fig. 9 is a horizontal section of the same, taken on line 9 of Fig. 8. Fig. 13 is a longitudinal section of the chuck, taken on line 13 of Fig. 12; and Fig. 14 is an enlarged perspective in detail of the bed-piece and recessed cam which gives the lateral motion to the sliding tool-holder.

In the drawings similar letters of reference indicate like parts wherever used.

On said drawings, A represents the frame of the machine; and B is the main shaft, mounted in suitable bearings, B', in the frame, and driven from the chuck-spindle C through the intermediate gear-wheels, $b$, $b'$, $b^2$, $b^3$, $b^4$, $b^5$, $b^6$, and $b^7$, meshing with each other. The gearings $b^2$ and $b^6$ turn on the non-revolving shaft $c$, and the gearings $b'$ and $b^5$ are keyed to shoulders on the gearings $b^2$ and $b^6$, respectively; and the gearing $b^3$ is keyed to a like shoulder on gearing $b^4$, which turns on the main shaft B, to which the gearing $b^7$ is keyed. The purpose of this system of gearings is to reduce the motion of the main shaft B, which carries the cams for actuating the different parts of the machine.

The hollow spindle C is mounted in suitable bearings, C', and derives its motion from the driving-pulley $C^2$ and the reversing-pulley $C^3$, the former of which is made of several sizes. Both these pulleys fit loosely on the spindle, and each in turn is connected with the spindle, so as to actuate it by means of the connecting-pins $d$ and $d'$, which fit loosely in radial holes in the spindle and in the fixed wheel D, secured thereto, and are pressed out from the center and against the interior circumference of the pulleys by the double cone-slide E, upon which the inner ends of the pins rest. The slide E is secured to or forms the end of the tube $e$, which fits loosely in the hollow spindle, and the slide is actuated by means of the lever $e'$, pivoted to the frame, and the cams $f$ and $f'$, bolted to the cam-wheel F, which is keyed to the main shaft. The upper end of the lever $e'$ is forked, and fits in a collar secured to the end of the tube $e$.

G represents a portion of the rod or wire from which the screw or other article is to be formed, and it is gripped firmly and caused to revolve with the spindle by means of the chuck secured to the end of the spindle.

The chuck consists of the part-way split tube H, having a conical exterior and hollowed out at $h$, for the purpose of giving elasticity to the split portions which form the jaws $h'$, for gripping the rod or wire. The tube H is secured by means of screw-threads to the hollow sleeve H', which itself is screwed to the end of the spindle C.

The jaws $h'$ are compressed so as to grip the rod or wire by means of the conical wedges $h^2$, consisting of a hollow cylinder split in two parts, having a conical interior to conform to the conical exterior of the jaws $h'$. The wedges $h^2$ are connected with the collar $h^3$ by means of the pins or screws $h^4$, and are actuated by means of the spiral springs $h^5$, one end of said springs fitting in recesses in the collar $h^3$ and their other ends in like recesses in the sleeve H'. The pins $h^4$ work in longitudinal slots $h^6$ in the sleeve H' when the collar is pressed forward or back. The collar $h^3$ is pressed forward, so as to compress the springs and open the jaws of the chuck to feed forward the rod, by means of the forked lever $h'$, pivoted to the frame at $h^8$, and carrying conical friction-rolls $h^9$, which fit against the conical end $h^{10}$ of the collar. This lever is actuated at proper intervals by the cam $h^{11}$, which is keyed to the main shaft. The rod G is pushed or fed forward when the jaws of the clutch are relieved from the pressure of the springs by means of a following-rod (not shown in the drawings,) impelled forward in the tube $e$ and hollow spindle by the pulley and weight I. I' is a portion of the tube in which this following-rod is supported.

J is the cross-slide or sliding tool-holder, mounted on the longitudinal slide K in a transverse groove, K', so that it may be shifted laterally therein for the purpose of bringing the different screw-forming tools in position for work. The said cross-slide or sliding tool-holder is provided with a number of holes or mortises, $j$, in its front face for the insertion of the screw-forming tools; and $j'$ are set-screws for the purpose of securing and adjusting the said tools in position. The drawings show only three such mortises; but any number desired may be provided. The sliding tool-holder is alternately advanced and drawn back by means of the cylindrical grooved cam L, keyed to the main shaft, operating upon a pin, $l$, secured to the slide K. The pin $l$ works back and forth in a slot, $l'$, in the bed-piece M, which is bolted securely to the frame of the machine, and the sliding tool-holder is at the same time shifted laterally by means of the recessed cam $m$, cut in the bed-piece, operating upon a spring-pin, M', the lower end of which projects down through a transverse slot in the slide K and fits in the cam $m$. The form of the cam $m$ is shown in the perspective view, Fig. 14, and consists in a groove returning into itself and having as many front prongs or ways, $m^2$, as there are tools on the tool-holder. The depth of this groove at different points is such that just before entering each of the ways $m^2$ the pin $m'$ will rise gradually and drop over an abrupt ledge, which is curved so as to guide the pin into the next way $m^2$ when the tool-holder is drawn back, thus preventing the pin returning backward in the same path and causing it to enter each of the ways $m^2$ in succession, and finally to return to its starting-point, when the same operation is repeated again and again. The engagement of the pin in the ways $m^2$ during the operation of the tools prevents lateral motion and holds the tool in line. The pin $m'$ is provided with a spring, $m^3$, to allow it to accommodate itself to the varying depth of the groove or cam.

Of course other equivalent means may be employed for communicating to the tool-holder its lateral and longitudinal motions, and I do not wish to confine myself to the specific means shown. I, however, prefer the means described, consisting of the cams L and $m$, as being the best method of practicing my invention.

Instead of shifting the tool-holder transversely by means of the cam $m$, its transverse motion may be imparted to it directly from the main shaft by a suitable cam thereon and connecting-lever, or other equivalent means.

N is the shaft or spindle, in the end of which the thread-cutting dies $n$ are secured by means of the conical screw-sleeve $n'$. The spindle N is mounted in a sleeve, $n^2$, inserted in one of the holes $j$ in the tool-holder, and is provided with a spring clutch or pin, $n^3$, which engages in a longitudinal clutch or groove, $n^4$, in sleeve $n^2$, so as to permit the spindle to revolve in one direction, but not in the other. The purpose of this clutch $n^3$ $n^4$ is to prevent the spindle N from revolving when the clutch is reversed in order to unthread and withdraw the die from the screw; and the front end of the sleeve $n^2$ and the shoulder $n^5$ of the spindle N are so shaped as to form a clutch, $n^6$, to prevent the spindle N from revolving while the die is cutting the thread. By this arrangement the die-spindle N has a free longitudinal motion independent of the sliding tool-holder, so that when the advance movement of the sliding tool-holder is stopped a little before the cutting of the thread is completed the die will continue to cut and thread the screw and the spindle N to advance until the two parts of the clutch $n^6$ are disengaged, when the die will revolve freely with the chuck, as the clutch $n^3$ $n^4$ offers no obstruction to its revolution in this direction; and when the chuck is reversed to unthread the die from the screw, as the die-spindle has a free longitudinal motion independent of the backward motion of the tool-holder, the die automatically accommodates its retracting motion to the number of threads on the screw and the velocity of revolution of the chuck. For this reason, though the driving-pulleys are of several different sizes, the reversing-pulley need be of but one size, and much less nicety is required in constructing and adjusting the cam which draws back the tool-holder, whereby much difficulty and trouble are avoided, as well as danger of jamming and injuring the thread for lack of proper adjustment.

The shank P of the cutting-off tool is adjusted and secured in one of the holes $j$ of the tool-holder, and is provided with a head, P', carrying the vertical slide $p$, to which the knife $p'$ is secured. After the knife $p'$ is brought into position by motion of the sliding tool-holder, the slide $p$ is pushed up vertically, carrying the point of the knife $p'$ across the axis of the revolving rod or wire, thus severing the screw therefrom by means of the rod $p^2$, actuated by the peripheral cam $p^3$ on the main shaft. The rod $p^2$ works up and down in a hole or bearing in the frame of the machine, and is provided with a spring, $p^4$, to regulate and steady its motion, and carries a friction-roller, $p^5$, at its lower end. The elongated portion $p^6$ of the cam $p^3$ pushes the rod $p^2$ up in front of the rod or wire G after the cutting-off tool has been retracted, so that its flat front face will serve as a stop or feed-regulating tool for the rod G when the chuck is opened, so as to allow the same to be pushed forward by the weight.

The shouldering or turning-down tool Q is of the ordinary construction, and is mounted parallel to the other tools in the sliding tool-holder. A stop or feed-regulating tool may be mounted in the sliding tool-holder, if desired or preferred, and my improved machine may be used with other cutting-off and thread-forming tools than those herein described.

Besides screws, my machine is also adapted to form rivets and other like articles by substituting the requisite forming-tools in the tool-holder.

The operation of my improved machine is as follows: The rod G being gripped in position for forming a screw by the chuck, and the machine being set in motion, the cam L causes the sliding tool-holder to advance, presenting the turning-down tool Q to the end of the revolving rod, the tool Q continuing to advance with the sliding tool-holder until it has done its work, when the cam L causes the tool-holder to recede and to again advance, while at the same time the cam $m$ causes the tool-holder to move laterally on the longitudinal slide K, so as this time to present the thread-cutting tool to the end of the rod. After the thread is cut, the instant the clutch $n^6$ becomes disengaged in the manner already described, so as to permit the die to revolve with the chuck, the cam L causes the tool-holder to recede a distance about equal to the length of the screw to be cut, at which point the cam-wheel F moves the conical slide E and reverses the motion of the chuck, and thus unthreads the die from the screw. The tool-holder recedes and again comes forward, this time bringing into position the cutting-off tool. As soon as the tool-holder stops the cam $p^3$ pushes up the slide and carries the knife across the axis of the rod, thus severing the screw from the rod, when the tool-holder again recedes into its original position, while at the same time the stopping-tool is pushed up in front of the rod G by the elongated part of the cam $p^3$, and at the same time the cam $h^{11}$ opens the jaws of the chuck, permitting the following-rod, actuated by the weight, to shove the rod G forward against the stopping-tool, thus gaging the length necessary for the next screw, when the jaws of the chuck again grip the rod, and the stopping-tool is withdrawn out of the way, and then the operation is repeated, as before.

The forms of the several cams described and their relative position on the main shaft B are such as to actuate the several devices and produce their operations in the manner and order described.

What I claim is—

1. The combination, with the chuck, the series of tools, the longitudinal and cross slides, and the mechanism for shifting the cross-slide back and forth, of the revolving cam for reciprocating the longitudinal slide and the mechanism for imparting continuous rotation thereto, substantially as described.

2. The combination, with the chuck, the turning-down tool, the threading-tool, the longitudinal slide, the cross-slide, and the automatic means for shifting said cross-slide back and forth, of the automatic mechanism for advancing the longitudinal slide, as well in threading as in turning down, and for returning the said slide, substantially as described.

3. The combination, with the chuck, the turning-tools, the longitudinal slide, and the cross-slide, of the shifting mechanism operated by the reciprocation of said longitudinal slide for shifting the cross-slide back and forth to present the tools successively in line with the axis of the chuck, substantially as described.

4. The combination, with the chuck, the means for opening and closing the jaws of said chuck, the longitudinal slide, the cross-slide, the turning-down or milling tool, the threading-tool, and the length-gage, substantially as described.

5. The combination, with the chuck, the longitudinal slide, the cross-slide, the turning-down or milling tool, the threading-tool, the length-gage, and the cutting-off tool, of automatic mechanism—such as the cams and connections—for opening and closing the chuck-jaws and for bringing said tools into action, substantially as described.

6. The combination, with the machine-frame, the chuck, and the length-gage supported by a stationary part of the machine and movable across the axis of the chuck, of the automatic mechanism for relieving and restoring the bite of the chuck-jaws and for operating said length-gage, substantially as described.

7. The combination, with a tool-holder and mechanism for imparting longitudinal and lateral motion thereto, of a pin and a series of ways or grooves arranged, as indicated, so as to prevent lateral motion of the tool-holder during the operation of the tools mounted thereon, substantially as described.

8. The combination of a revolving chuck, a series of tools mounted on the tool-holder J, slide K, tool-holder J, mounted on said slide, and cams L and $m$, substantially as described.

9. The combination of the tool-holder with the spindle for the thread-cutting die, and clutch $n^3$ $n^4$ to hold said spindle for the purpose of unthreading the die from the screw and at the same time permit a free longitudinal motion of the die-spindle independent of the motion of the tool-holder as it is withdrawn without disengagement of said chuck, substantially as described.

10. The recessed cam $m$, arranged and constructed, substantially as described, to permit an alternately advancing and retreating motion to the tool-holder, in combination with the sliding tool-holder, substantially as set forth.

11. The combination of the tool-holder, slide K, pin $m'$, and cams L and $m$, substantially as described.

12. The combination of the chuck, tool-holder, cutting-off tool carried by said tool-holder, knife-carrying slide, rod $p^2$, and cam $p^3$, substantially as described.

13. The combination of the hollow chuck-spindle, the driving and reversing pulleys, connecting-pins, double cone-slide E, tube $e$, located inside of said spindle, and actuating cam-wheel F, substantially as described.

14. The combination of the conical jaws, made in one tubular piece split back a portion of its length, with the cylindrical exteriorly-conical interiorly-split sleeve, collar $h^3$, pins $h^4$, springs $h^5$, and cam and lever for actuating the chuck, substantially as described.

ALLEN JOHNSTON.

Witnesses:
J. M. MURRAY,
EDMUND ADEAK.